Aug. 16, 1949.    R. F. JONES    2,479,010
FISH CUTTING MACHINE
Filed April 30, 1946    8 Sheets-Sheet 7

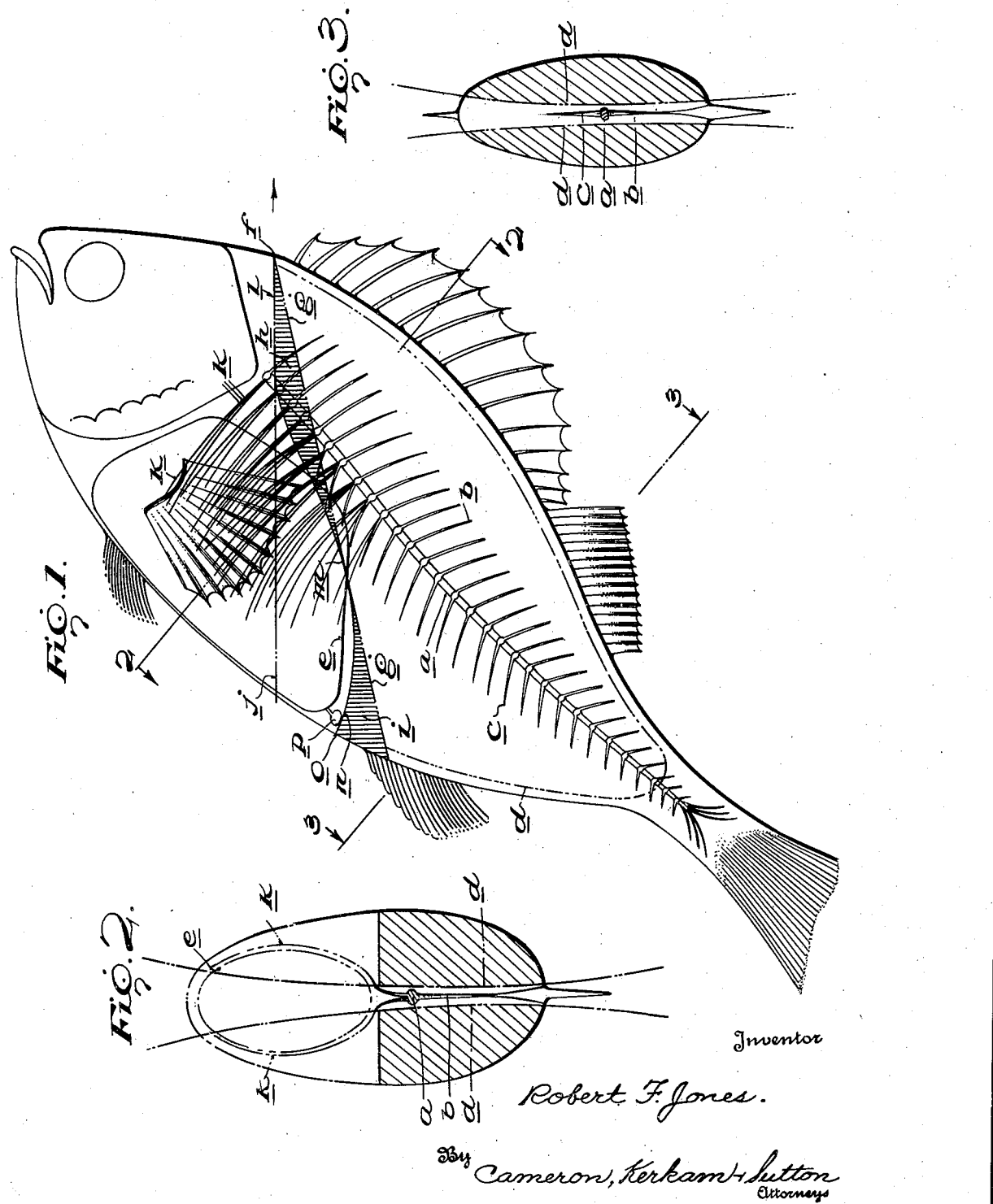

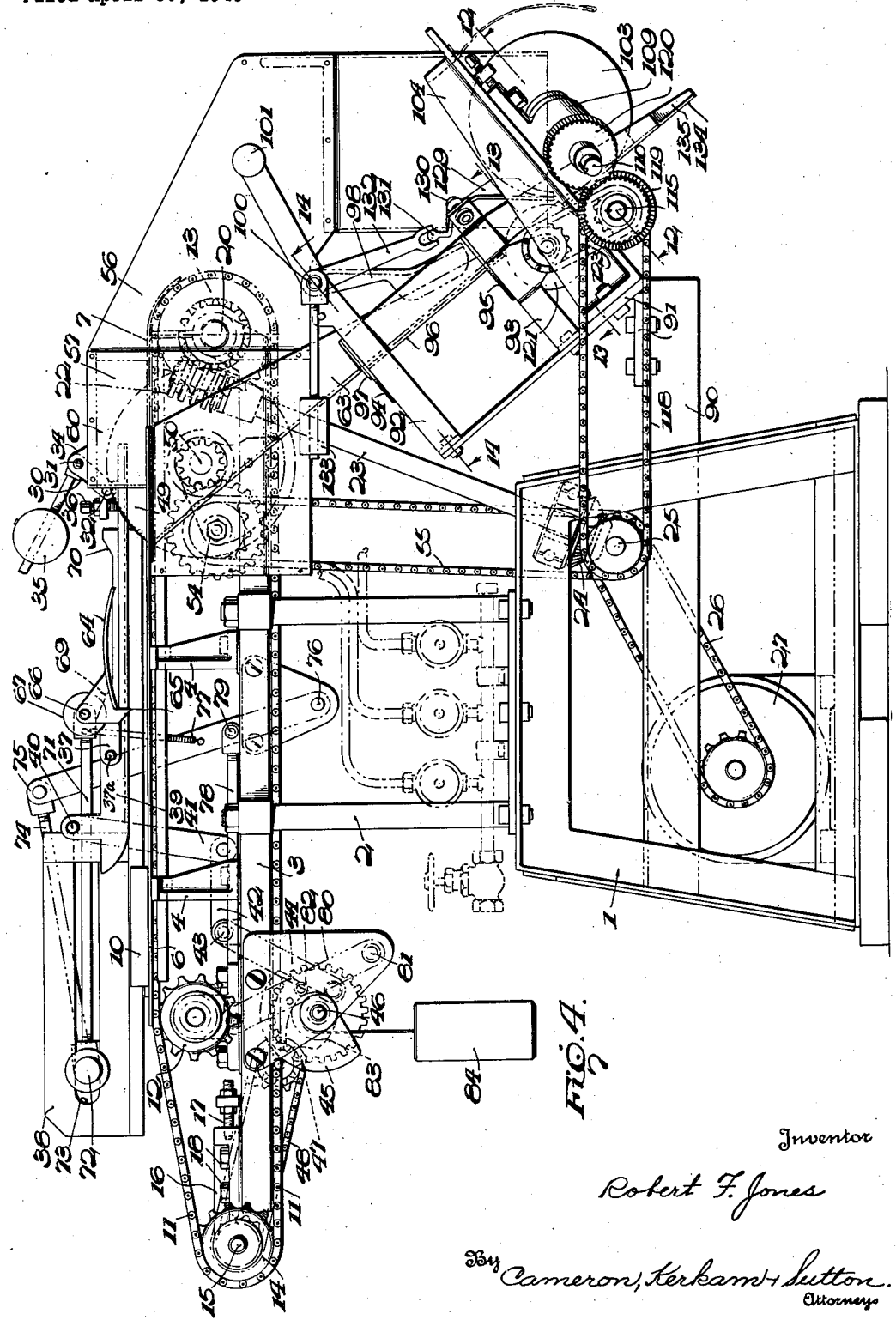

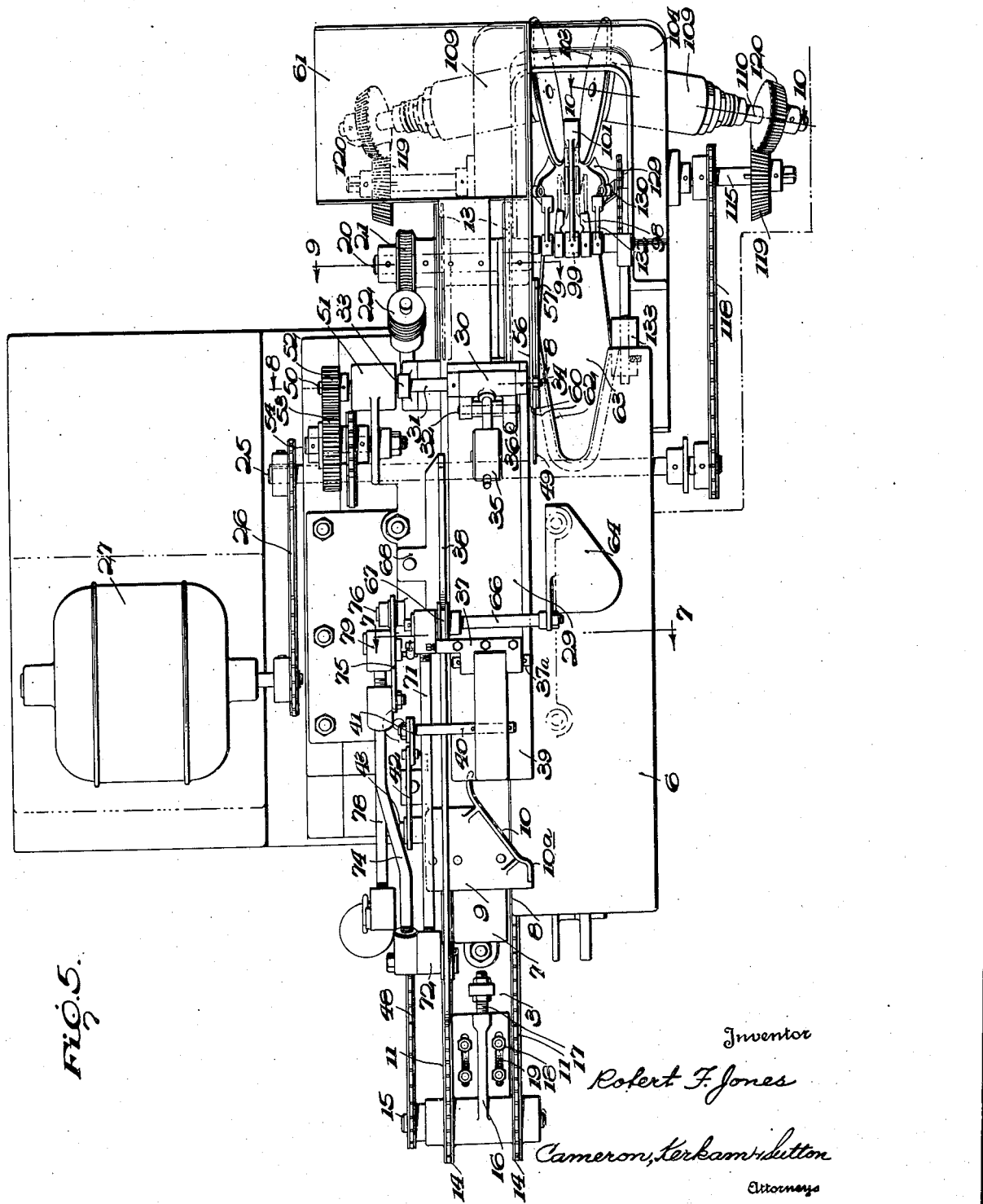

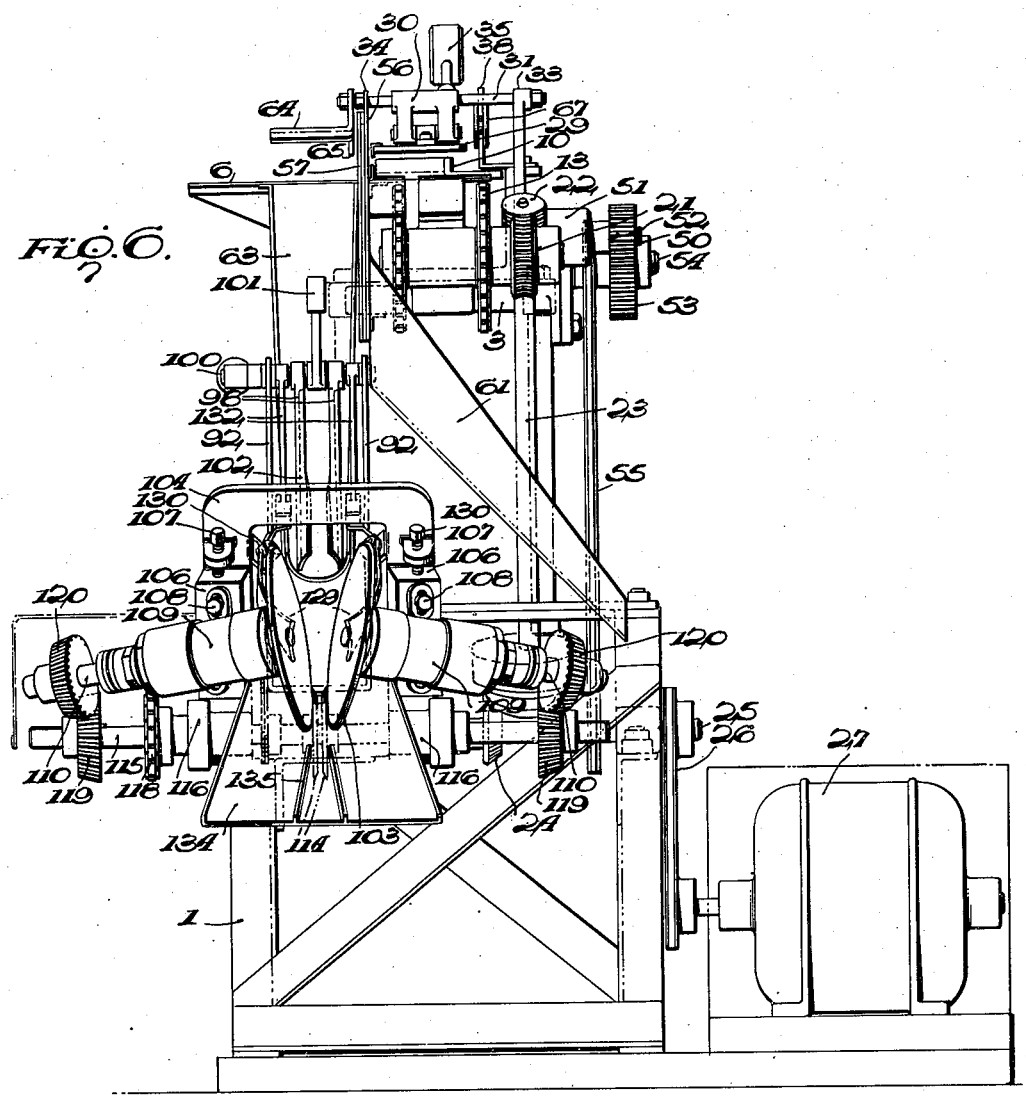

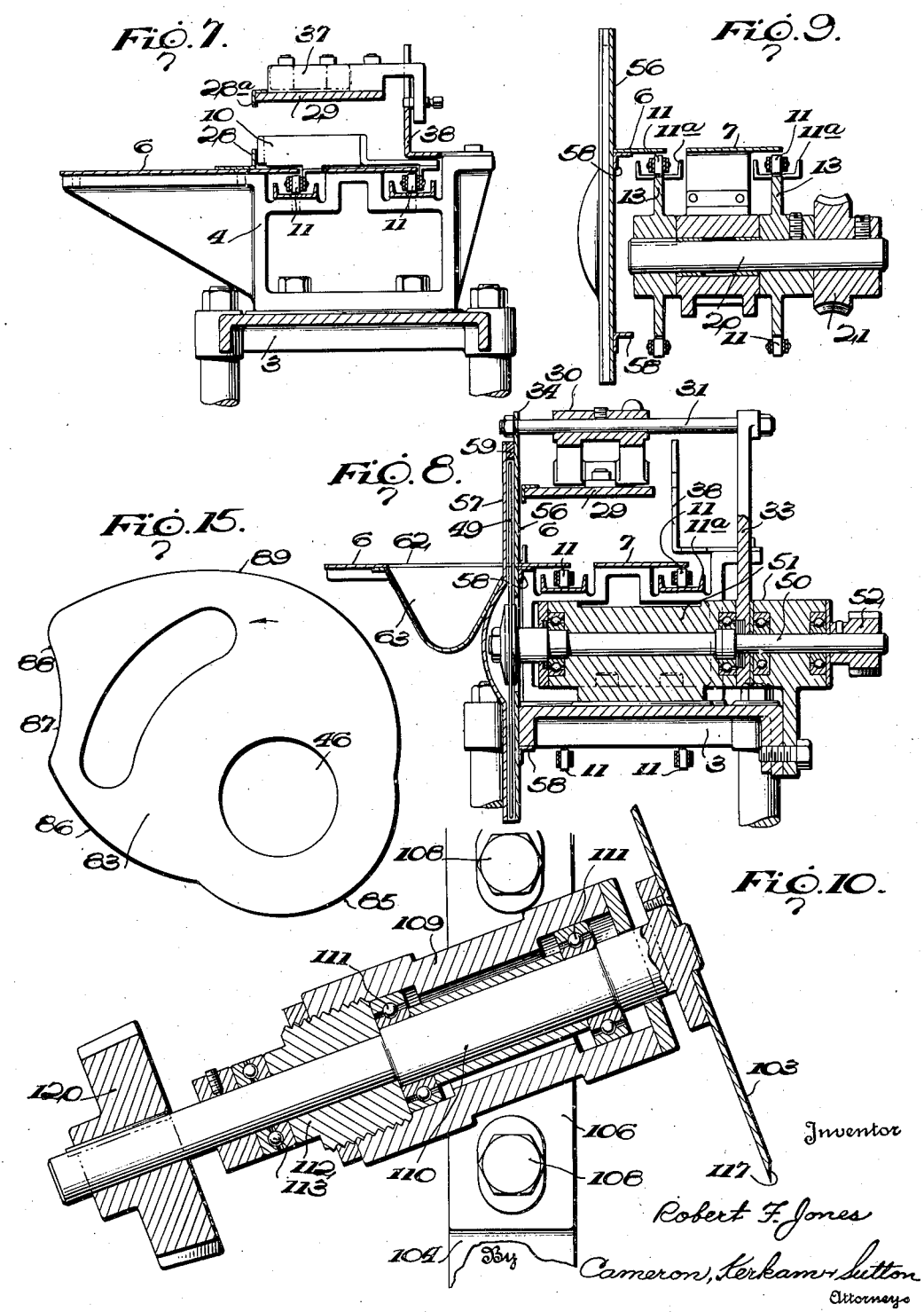

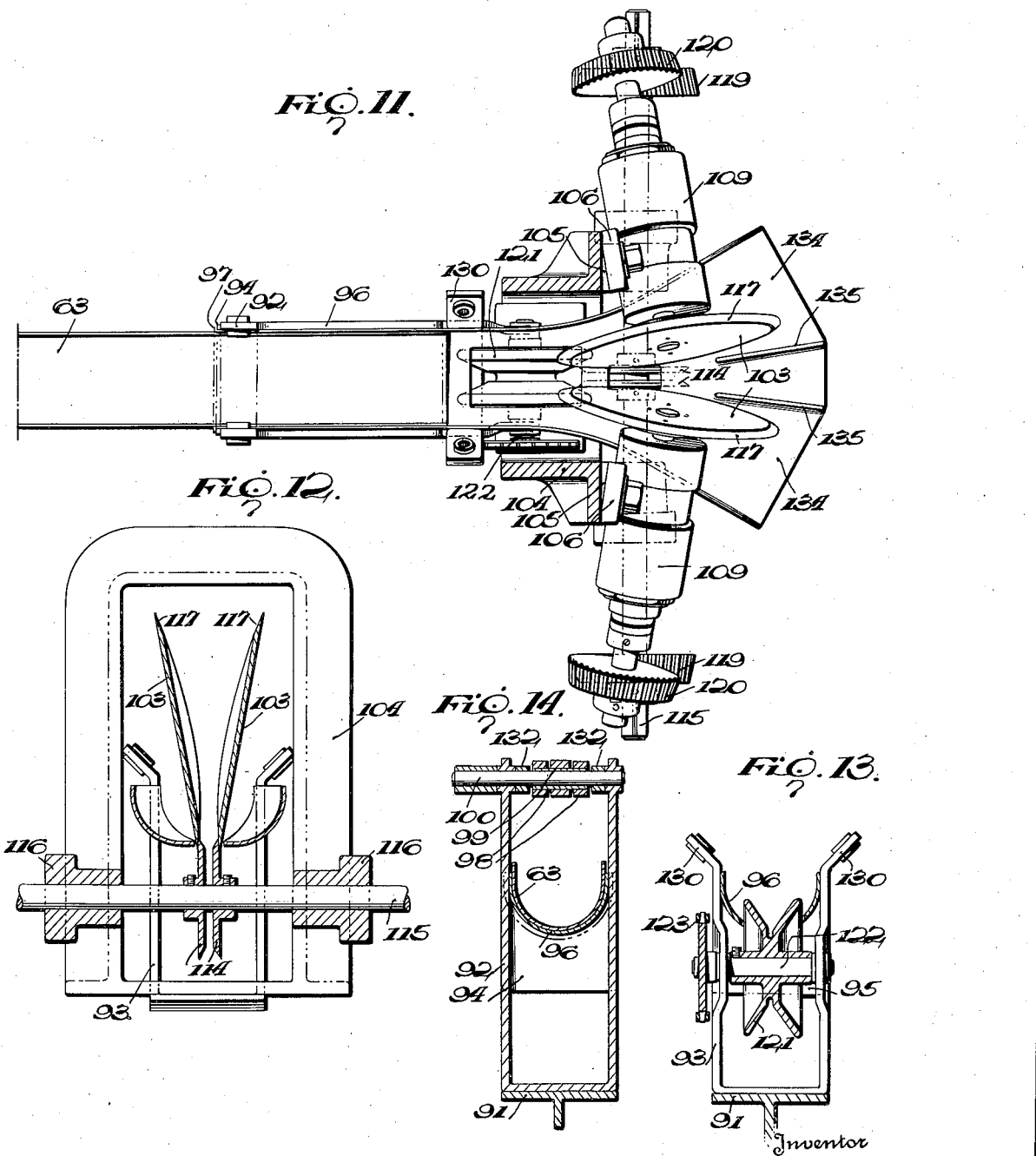

Inventor
Robert F. Jones.
By Cameron, Kerkam & Sutton
Attorney

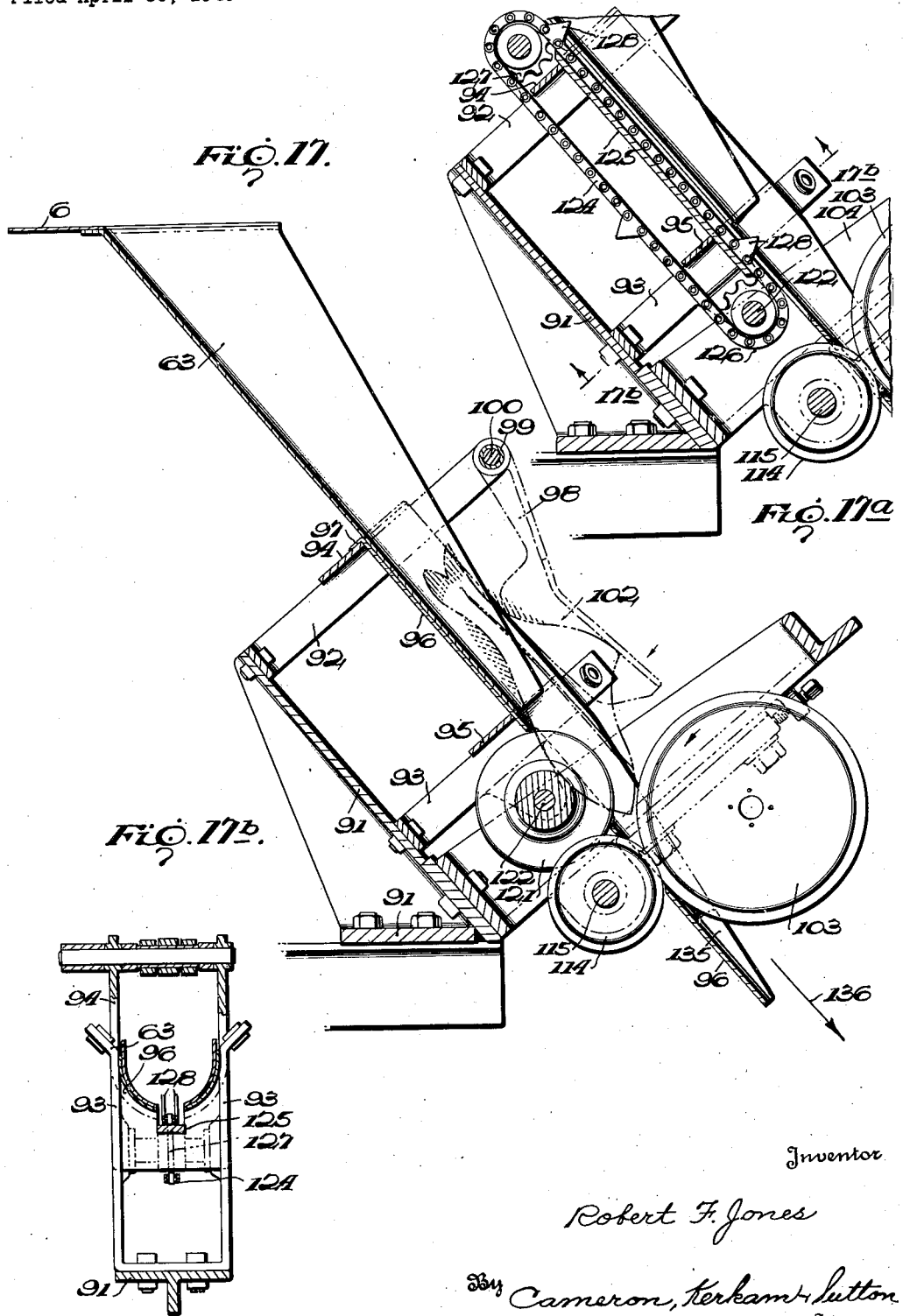

Patented Aug. 16, 1949

2,479,010

UNITED STATES PATENT OFFICE 2,479,010

FISH CUTTING MACHINE

Robert F. Jones, Framingham, Mass.; Ada P. Jones, executrix of said Robert F. Jones, deceased, assignor to General Foods Corporation, New York, N. Y., a corporation of Delaware Application April 30, 1946, Serial No. 666,093

39 Claims. (Cl. 17—4)

This invention relates to a fish cutting machine and particularly to a machine for removing the head and entrails and then filleting fish such as redfish. This application is a continuation in part of my prior application Serial No. 582,434 filed March 13, 1945 for Fish cutting machine now abandoned.

A general object of the invention is to provide a fully automatic machine that is quick and precise in the operations performed and that cleanly cuts the fillets with the least possible loss of edible flesh.

In order to sever the head and entrails, it is necessary to cut across the fish at an acute angle to the backbone. As will be explained hereinafter, if this cut is made in a straight line as heretofore proposed, and is so located as to remove completely all undesirable parts, then there is a waste of edible flesh. On the other hand, if a straight cut is so located as to avoid this waste, then the fillets are not clean and must be hand-trimmed. A particular object of the invention is to provide a non-linear cut such that the maximum amount of edible meat is retained whereas the need for hand trimming is eliminated.

Another object is to provide improved filleting means which positively insure the complete and clean cutting and separation of the fillets from the waste middle section including the backbone and tail with maximum yield of edible flesh or meat.

Other objects will appear hereinafter as the description of the invention proceeds.

One embodiment of the invention has been illustrated in the accompanying drawings, but it is to be expressly understood that said drawings are for purposes of illustration only and are not to be construed as a definition of the limits of the invention, reference being had to the appended claims for this purpose.

In said drawings,

Fig. 1 is a diagrammatic view showing the structure of a redfish and illustrating the beheading and filleting cuts to be made;

Figs. 2 and 3 are sections on the lines 2—2 and 3—3 of Fig. 1;

Fig. 4 is a side view of a machine embodying the invention;

Fig. 5 is a plan view of the machine;

Fig. 6 is an end view of the machine;

Figure 16C:
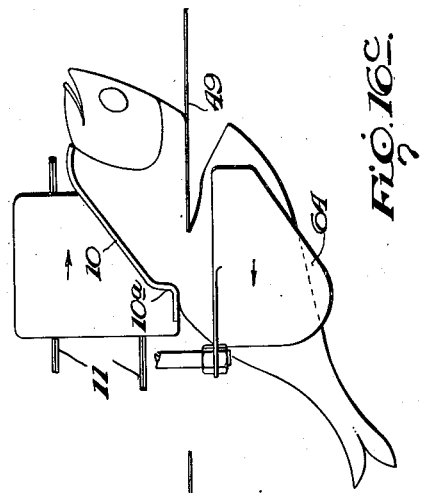

Figs. 7, 8, 9 and 10 are sections taken on the lines 7—7, 8—8, 9—9 and 10—10 of Fig. 5;

Fig. 11 shows the filleting chute and knives as seen from a point above and to the right of these parts as shown in Fig. 4, the line of sight being perpendicular to the inclination of the chute;

Figs. 12, 13 and 14 are sections taken on the lines 12—12, 13—13 and 14—14 of Fig. 4;

Fig. 15 is a detail of one of the operating cams of the machine;

Figs. 16a—16f comprise a series of diagrammatic illustrations of successive stages in the beheading operation;

Fig. 17 is a somewhat diagrammatic view illustrating details of the filleting operation; and Fig. 17a illustrates an additional feeding means that may be employed in the filleting operation.

Figure 17b is a sectional view taken on line 17b—17b of Figure 17a.

In describing the apparatus and in order to make its functions and results clear, it is desirable first to consider briefly the structure of the fish and to describe the nature and location of the beheading and filleting cuts with respect thereto. For these purposes reference may be had to Figs. 1, 2 and 3.

The backbone $a$ carries upper and lower spikes $b$ and $c$ which extend throughout the edible portion of the fish remaining after beheading. These bones lie substantially in a central plane as shown in Figs. 2 and 3 so that after the beheading operation two fillets free of these bones can be cut along the lines $d$ of these figures, one on each side of this plane. The outline of one of these fillets is shown by the correspondingly lettered line $d$ of Fig. 1.

If these fillets are to be perfectly clean so that hand trimming is unnecessary, then the cut made by beheading knife or saw must be so located as to miss practically all of the more or less curved rear edge of the belly cavity indicated by the line $e$ in Figs. 1 and 2. Also the point $f$ on the back of the fish, where the cut either starts or ends depending on its direction, should be located so that the cut is made as close as possible to the skull bones of the fish. These two requirements determine the location of a straight line $g$ (Fig. 1), but if the fish is cut on this line there will be a waste of edible meat represented by the hatched areas $h$ and $i$. To avoid such waste, it would be necessary to cut from the point $f$ approximately along the straight line $j$ across the belly cavity, leaving a large dark spot on the inside of each fillet which would have to be trimmed off by hand. Also this line $j$ would cut across and leave substantial lengths of the fine needle bones $k$ in the edible portion. These needle bones spread laterally around the belly cavity (Fig. 2) their ends remaining in the edible portion would project across the lines d of the filleting cuts so that parts of such bones would be left in the fillets.

By making the cut approximately as shown by the non-linear line of Fig. 1, however, the waste of the shaded areas h and i can be avoided while at the same time hand trimming can be substantially eliminated. The cut can be made in either direction desired, but it will hereinafter be assumed that it is preferred to start the cut at the point f on the back of the fish, the fish moving back first toward and past the cutter as indicated by the arrow in Fig. 1. From this point the initial part l of the cut is straight until it reaches the backbone, being aligned with the line j and including the shaded area h in the edible portion from which the fillets are later cut. As the cut passes through the backbone, however, it swings rearwardly away from the line j so as to miss the greater part of the needle bones k, and its continuation m passes close to the upper rear corner of the belly cavity indicated by the line e in substantially the same position as the line g. However, instead of following this line and wasting the shaded area i, the continuation n of the desired line swings forwardly again and emerges from the belly of the fish at the point o just slightly to the rear of the vent p.

As described hereinafter, the edible portion of the fish then passes to filleting knives on its back (Figs. 2 and 3) and the filleting knives are so arranged that the lines of cut through the fish are curved, the inner surface of each fillet thus being slightly convex as shown by the dotted lines d. Preferably these lines are closest together at a point between the backbone of the fish and its back as the filleting cut begins (Fig. 2). During the initial part of the filleting cut the resulting greater spacing between the cutting edges above the backbone (that is, on the belly side of the fish) is not disadvantageous because no fillet is cut from this side of the backbone until the knives reach the line m. On the other hand, the beheading cut leaves in the edible portion some short ends of the needle bones k near the backbone as well as the upper rear corner of the belly cavity as will be seen in Fig. 1. However, these remaining undesirable parts extend only a short distance on either side of the center line of Fig. 2 and due to the wider spacing of the cutting edges above the backbone they lie between the lines d and are excluded from the fillets.

As the filleting cut proceeds toward the tail of the fish, the position of the backbone with respect to the cutting edges is progressively lowered as shown by Fig. 3 where the backbone is about at the point where the blade edges are closest to one another. Thus the lines d of the filleting cut are closer together above the backbone than in Fig. 2 and the yield of edible flesh or meat is increased.

Figs. 4, 5 and 6 are assembly views of one form of apparatus for performing the beheading and filleting operations described above, wherein the beheading and filleting mechanisms are combined in a unitary machine and associated in such a way that the operation is fully automatic from the time that the fish is placed in the machine until the fillets are discharged therefrom. The construction of this embodiment of the invention will now be described with reference to Figs. 4, 5 and 6 and the associated detail views of Figs. 7-15 inclusive.

The machine is supported by any suitable framework 1 carrying uprights 2 which support a plate 3. Brackets 4 extend upwardly from plate 3 and carry a table at the top of the machine over which the fish are advanced by suitable feeding devices to the beheading cutter. In the form shown, the table comprises a side section 6 and a central section or strip 7 both of which are carried by the brackets 4, the adjacent edges of these sections being separated to provide a slot 8.

There may be any suitable number of feeding devices of any desired construction. One such device is shown in the drawings and comprises a plate 9 having a vertical flange 10 which pushes the fish ahead of it along the table 6, 7. The plate 9 is carried by suitable brackets mounted on a pair of feed chains 11 beneath the table one chain traveling beneath the slot 8 and the other chain being on the other side of the table section 7 (Fig. 7). The upper horizontal reaches of these chains runs in channels 11a carried by the brackets 4 and between spaced pairs of sprockets 12 and 13 carried in suitable bearings mounted on the plate 3. After passing around the sprockets 13 at the end of the plate 3, the chains return beneath the plate to sprockets 14 at the other end of the plate and thence back to the sprockets 12. The sprockets 14 are mounted on a shaft 15 rotating in a bearing formed as part of a bracket 16 which is longitudinally adjustable on the table 3 by means of a screw 17 and is secured in adjusted position by means of bolts 18 passing through slots 19 in the bracket.

The chains may be driven in any suitable manner, and in the form shown the sprockets 13 serve as drive sprockets, being carried by a drive shaft 20 and a worm gear 21 thereon that is driven by a worm 22 on a shaft 23. The lower end of this shaft is driven through bevel gearing 24 by a main drive shaft 25 of the machine which is carried by the frame 1 and connected by a chain 26 with a driving motor 27.

As the fish moves along the table a head of the pusher 10 it lies on one side at an angle to its direction of movement as described more fully hereinafter. The lateral position of the fish is controlled partly by the configuration of the pusher, especially at its trailing end 10a, but also by a longitudinal guide strip 28 (Fig. 7) which projects upwardly from the table section 6 and is adapted to engage the operculum or gill cover of the fish on its under side.

Also the fish is advanced along the table under a hold-down plate 29 which is carried at one end by a bracket 30 rocking freely on a pivot pin or shaft 31 and pivotally connected to the hold-down plate at 32. The pivot shaft 31 may be mounted in any suitable manner and in the form shown is supported at one end in a bracket 33 extending up from the table 3 (see Fig. 8) and at the other end in a bearing 34 formed at the top of the saw housing described hereinafter. A weight 35 tends to swing the bracket 30 and plate 29 downwardly, and the lowermost position of the plate is adjusted by a screw 36 passing through the bracket and engaging the top of the plate. Hence the plate 29 can lift as a fish passes under it but rests on top of the fish due to its own weight and to the weight 35. Also the frictional drag of the fish against the under surface of the plate tends to increase the pressure of the plate on the fish. The other end of the plate is free to lift but is prevented from dropping onto the table by a bracket 37 which extends laterally over a vertical plate 38 (Fig. 7). The plate 38 extends longitudinally of the machine and has other functions which are pointed out below.

In loading the machine, the fish is placed on the table ahead of the hold-down plate 29 with its operculum or gill cover over the guide strip 28 and is then swung into its inclined position as it is moved ahead by the advancing pusher 10. Preferably the fish, after being thus placed on the table, is clamped by a vertically movable extension 39 of the hold-down plate 29 prior to the time that it is engaged by the advancing pusher. As shown, this extension 39 is pivoted on the end of the hold-down plate 29 by means of a pivot pin 37a passing through bearings formed as part of the bracket 37 mentioned above, and is oscillated about the pin 37a in any suitable manner. In the form shown, an operating arm 40 extends through a bearing lug on the extension 39 and is connected by a link 41 to an arm 42 on a rockshaft 43 mounted on the table 3. A second arm 44 on the rockshaft is operated by a cam 45 on one end of a cam shaft 46 which extends transversely beneath the table 3, this cam shaft being suitably driven in timed relation with the feed chains as by means of gearing 47 and a drive chain 48 extending to the shaft 15 of the chain sprockets 14.

The fish having been placed on the table as described above and engaged by the extension 39, the pusher 10 comes in contact with the fish and moves it forward on the table, meanwhile swinging it to an inclined position corresponding to the inclined face of the pusher 10. As the fish moves forwardly under the hold-down plate 29, its operculum on the lower side is in engagement with the guide strip 28 mentioned above, and preferably the operculum on the other side of the fish is engaged by a corresponding guide strip 28a (Fig. 7) which extends down from the hold-down plate. In this position the fish is advanced to and past a beheading cutter which preferably comprises a disc saw 49 rotating in a vertical longitudinal plane slightly to one side of the guide strips 28 and 28a, the pusher 10 passing the saw on the other side.

The beheading saw 49 may suitably be mounted on and driven by a shaft 50 rotating in bearings 51 carried by the plate 3 and driven by gears 52, 53 from a shaft 54 connected by a chain 55 with the main driveshaft 25 mentioned above. The bearing bracket 33 for the pivot shaft 31 mentioned above may suitably be mounted between the bearings 51 as shown in Fig. 8.

Preferably the greater part of the saw is enclosed in a housing comprising parallel plates 56 and 57, the plate 56 being mounted by angles 58 connecting it to the table 6 and to the plate 3 and the plate 57 being mounted on the plate 56 by means of an interposed spacer 59. As will be seen in Fig. 8, this housing extends upwardly through the table 6 and the bearing 34 for the other end of the pivot shaft 31 mentioned above may suitably be provided on the top edge of the plate 56. Thus the saw 49 is completely enclosed except that the plates 56 and 57 are cut back at the top of the table to expose a short section of the periphery of the saw as shown in Fig. 4. The leading vertical edges of the cut back parts of the plates 56 and 57 are preferably beveled at 60 to provide sharp edges which separate the severed parts of the fish from the sides of the saw. The pusher 10 travels past the saw 49 on one side and advances the severed head and entrails to the end of the table where these parts drop onto an inclined discharge chute 61. Just as the edible portion of the fish on the other side of the saw is completely severed from the head, it reaches the edge of a notch or recess 62 in the table section 6 and drops into an inclined chute 63 leading to the filleting means described hereinafter.

As shown in Fig. 1, it is desired that the beheading cut made by the saw 49 shall have a non-linear direction through the fish, and in order to accomplish this result it is necessary to adjust the position of the fish as it is being severed by the saw. For this purpose a second feeding device is provided which engages and controls the edible portion of the fish as it passes the cutting edge of the saw, this second device passing the saw on the side of the recess 62 and chute 63 mentioned above. In the form shown, this second feeding device comprises a plate 64 which at times occupies a stationary elevated position as shown in Fig. 4 but is adapted to be moved downwardly and forwardly into engagement with the tail or edible portion of a fish passing thereunder. Preferably the under surface of this plate is slightly curved to engage the upper surface of the fish, and the plate also has a depending projection or finger 65 which engages the rear or trailing edge of the edible portion and moves in a line which passes close to the saw 49.

When the feeding device 64 has been brought into engagement with the edible portion, which is being moved ahead by the pusher 10, the forward movement of said device is then controlled relative to the forward movement of the pusher 10 in such a manner that the edible portion is first momentarily retarded and then accelerated relative to the nose or head end of the fish. This retardation takes place as the saw has cut part way through the fish and substantially as it reaches the backbone of the fish, and the subsequent acceleration takes place as the saw completes its cut through the fish, with the result that the line of cut *l*, *m*, *n* of Fig. 1 is obtained as explained in detail hereinafter in connection with Figures 17a–17f, inclusive.

The means for said controlling the movement of the feeding device 64 may take various forms. In the form shown, this device is mounted on one end of a rod 66 which extends over the hold-down plate 29 and is provided with a roller 67 running on the upper edge of the plate 38 mentioned above. This plate is mounted in any suitable manner as by means of brackets 68 secured to the frame brackets 4 (Fig. 7), and is provided with inclines 69 and 70 at the ends of travel of the device 64. When this device is retracted in its stationary waiting position, the roller 67 has run up the incline 69 so that the feeding device is elevated above the path of travel of the fish along the table. The device is held in this position by a rod 71 which connects one end of the rod 66 with a slide 72 movable longitudinally in a guide slot 73 formed in the other end of the plate 38. Slide 72 is in turn connected by a rod 74 with one end of a lever 75 pivoted at 76 on a bracket depending from the table 3. The rod 71 and the lever 75 are preferably connected by a spring 77.

The lever 75 is oscillated on its pivot 76 by means of a rod 78 pivoted to the lever at 79 and extending to the end of an operating arm 80 pivoted at 81 and carrying a roller 82 which engages the surface of a cam 83. This cam is mounted on the cam shaft 46 mentioned above, and the roller 83 is held in engagement with the cam by suitable means such as a weight 84 attached to the arm.

The contour of the cam 83 is shown in dotted lines in Fig. 4 and in detail in Fig. 15. In the position shown in Fig. 1, the arm 80 and consequently the feeding device 64 are held stationary since the roller 82 is in engagement with the cam surface 85 which is concentric with the axis of the cam shaft 46. As the pusher 10 engages a fish and moves it forwardly under the hold-down plate 29, however, the cam surface 86 reaches the roller 82 with the result that the feeding device 64 is moved forwardly in the direction of movement of the fish and at the same time downwardly into engagement with the fish since the roller 67 runs down the incline 69. This engagement must be effected not later than the time when the saw 49 has cut through the fish to the point at which retardation of the edible portion is desired. However, it may be effected sooner if the cam surface 86 is designed to move the device 64 forwardly at the same speed as the pusher 10. At the instant that retardation of the device 64 is desired, the recess or dwell 87 in the cam surface reaches the roller 82 with the result that the forward movement of the device 64 relative to the forward movement of the pusher 10 is retarded by the weight 84. This retardation is only brief, however, as the roller 82 is then engaged by the cam surface 88 whereby the device 64 is accelerated relative to the forward movement of the pusher 10 and elevated as the roller 67 runs up the incline 70. These movements take place as the saw completes its cut through the fish, when the cam surface 89 engages the roller 82 and the device 64 is rapidly returned to the position shown in Fig. 1 by the weight 84.

The edible portion falls on its back and cut end foremost into the filleting chute 63 which extends downwardly at any desired angle of inclination to filleting means the details of which are shown in Figs. 10-14. The lower end of the chute and the filleting means may be supported in any suitable manner. As shown an arm 90 extends from the base frame 1 and carries an angle bracket 91 to which U-shaped supports 92 and 93 are secured. The filleting chute 63 extends between the arms of these supports and is carried by recessed plates 94 and 95 secured to the supports. Preferably the filleting chute is made in two sections, the lower end of the upper section 63 nesting in the upper end of the lower section 96 and the latter having a flanged end 97 hooked over the plate 94 to hold the chute in position.

Suitable means are preferably provided for maintaining the edible portion of the fish in an upright position as it moves down the chute. For example, a pair of guide arms 98 are mounted on a sleeve 99 which is free to turn on a shaft 100 supported in bearings in the upper ends of the arms of the support 92. A weight 101 carried by the sleeve 99 tends to swing the lower ends 102 of the guide arms downwardly toward the bottom of the feed chute, these lower ends 102 being turned inwardly over the top of the fish so as to hold it upright as it moves down the chute.

The filleting knives at the lower end of the chute comprise a pair of rotating disk blades 103 carried by a yoke-shaped bracket 104 that is mounted in an inclined position on the angle bracket 91 mentioned above. Preferably the axes of these knives are angularly related to each other in the following manner. The lower face of the inclined yoke 104 lies in a plane substantially perpendicular to the line of feed as defined by the bottom of the feed chute 63, 96.

The faces of the two arms of the bracket 104 are provided with transversely inclined surfaces 105 (Fig. 11) which increase in height toward each other or toward the center line of the filleting mechanism. Bearing blocks 106 are adjustable on the inclined surfaces 105 by means of screws 107, being secured in adjusted position by bolts 108. These blocks carry bearing sleeves 109 which are inclined upwardly and inwardly toward each other across the faces of the bearing blocks 106 as shown in Fig. 10. Each knife 103 is carried on the end of a shaft 110 rotating in the sleeve 109 on roller bearings 111, the shaft being held in place by a nut 112 and provided with a suitable thrust bearing 113.

Hence the axes of the knives 103 are inclined relative to each other at the angle shown in Fig. 10 and also at the angle shown in Fig. 11. This arrangement brings the point of closest approach of the blade peripheries at a point somewhat above the line of feed and up the feed chute with respect to a plane through the blade centers perpendicular to the line of feed. Hence the lines $d$ of the filleting cuts as shown in Figs. 2 and 3 are curved and are closest together at a point somewhat below the backbone $a$ of the fish as shown in Fig. 2.

Cooperating with each of the knives 103 is a shearing disc 114, these shearing discs being mounted below the feed chute on a shaft 115 that is supported in bearings 116 on the lower face of the yoke 104. The peripheries of the knives 103 are adjusted so as to be very close to the bottom of the feed chute 96, and the peripheries of the shearing discs 114 project upwardly through an opening in the bottom of the feed chute so as to cooperate with the peripheries of the knives 103 as shown in Fig. 12. Preferably the peripheries of the shearing discs overlap somewhat the peripheries of the knives 103 to provide good shearing action, and preferably the shearing discs cooperate with the inner faces of the knives, the latter being beveled at 117 for this purpose.

Any suitable means can be provided for driving the knives 103 and the shearing discs 114. In the form shown, the shaft 115 of the shearing discs is driven by a chain 118 from the main driveshaft 25 of the machine. Bevel gears 119 on the ends of the shaft 115 mesh with bevel gears 120 on the ends of the shaft 110 of the knives 103.

To insure positive feeding of the edible portion of the fish to the filleting knives and shearing discs and to avoid possible jamming, the back of the fish passes over a grooved feed roller 121 which projects upwardly through an opening in the bottom of the feed chute just ahead of the knives. This roller 121 may be mounted on a shaft 122 extending through bearing brackets on the arms of the bracket 93, and may be driven by a chain 123 from the shaft 115.

In the event that more positive feed should be desirable, pushers may be provided to move down the bottom of the feed chute to a point close to the knives 103. Figs. 17a and 17b show the use of such pushers in the chute instead of the roller 121 described above. The bottom of the chute 63, 96 is slotted and a chain 124 runs beneath the slot on a rail 125 which is carried in notches in the plates 94, 95. This chain runs around a drive sprocket 126 on the shaft 122 on which the roller 121 was previously mounted, and around an idler sprocket 127 carried by the support 92. Certain pairs of links of the chain 124 carry points 128 which project through the slot in the bottom of the feed chute and engage the fish to force it positively down the chute and against the knives 103.

It may also be desirable to provide means for holding down the advancing end of the edible portion of the fish at a point close to the periphery of the knives 103. This may be accomplished by a second pair of arms 129 the ends of which swing inwardly and downwardly on the top of the fish close to the cutting knives. As shown, these arms 129 are mounted in bearings in the angularly arranged upper ends 130 of the arms of the support 93. The upper ends of the arms 129 have slidable connections at 131 with the forked ends of a pair of arms 132 mounted on the shaft 100 mentioned above, the end of this shaft carrying a weight 133 which tends to swing the arms 129 in against the fish as described above.

In general, the operation of the machine will be understood from the foregoing description. However, the production of the non-linear beheading cut is illustrated more clearly by Figs. 16a to 16f inclusive. As shown in Fig. 16a, the pusher 10 has advanced the fish against the saw 49 while the saw has been cutting through the straight section $l$ of the cut (Fig. 1). Meanwhile the device 64 has moved down and ahead into engagement with the tail or edible portion of the fish. Just at this point the forward movement of the device 64 begins to be retarded by the cam dwell 87 (Fig. 15).

Figure 16F:
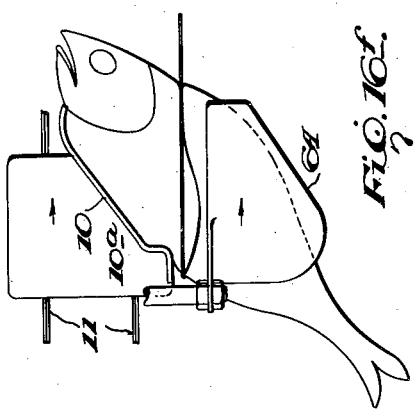
Figure 16B:
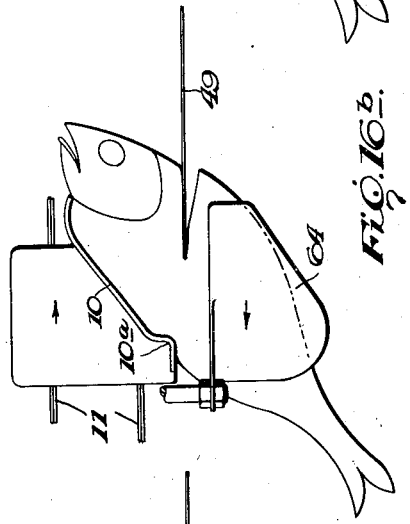

The effect of this retardation is illustrated by Figs. 16b and 16c. The forward movement of the device 64 is now slower than that of the pusher 10 and hence the device exerts a retarding drag on the edible portion. The partially severed head of the fish is held against lateral movement by the saw blade, but the pusher 10 at and near its inner trailing end 10a is in engagement with the soft belly of the fish and the entire belly cavity is relatively easily compressible. The backbone $a$ having been severed, there is no rigid structure between the edge of the saw 49 and the end 10a of the pusher, so that the rearward drag of the device 64 tends to swing or crowd the flesh of the edible portion inwardly toward the pusher 10, compressing the belly against the pusher 10 and progressively opening the already cut portion as shown in Figs. 16b and 16c. Bearing in mind the fact that the fish as a whole is continuously advancing, the effect is to force the edible portion in under the saw and to produce approximately the section $m$ of the line of cut shown in Fig. 1.

Figure 16E:
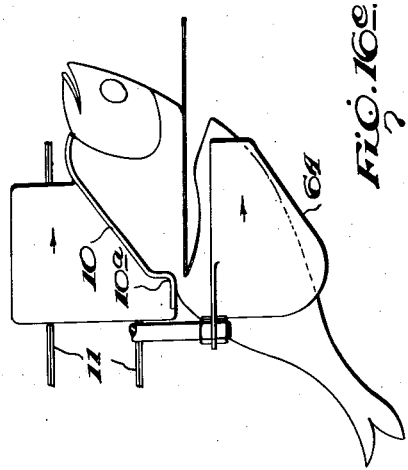
Figure 16A:
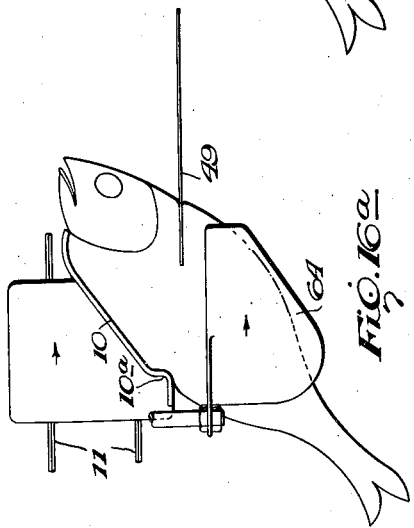
Figure 16D:
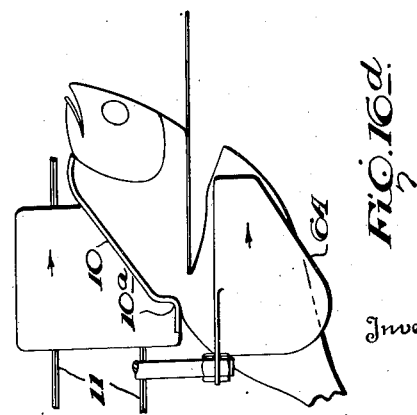

As the fish reaches the position shown in Fig. 16d, the end of the dwell 87 in the cam has been reached and the portion 88 of the cam surface is coming into action. The effect of this part of the cam is shown by Figs. 16e and 16f. The device 64 is now accelerating and moving ahead at a faster rate than the pusher 10. The engagement of the device with the top of the fish and the engagement of the projecting finger 65 with its trailing edge advance the edible portion of the fish relative to its nose end, eliminating the inward crowding or forcing described above and instead tending to swing the edible portion away from the inner end 10a of the pusher while progressively closing the cut portion of the fish against the saw. The effect of this acceleration hence is the reverse of the retardation described above, producing approximately the section $n$ of the line of cut shown in Fig. 1.

As the end of the acceleration is reached, the device 64 is also elevated by the incline 70. At this instant the fish reaches the position shown in Fig. 16f and the cut is completed. During this action the finger 65 is in engagement with the trailing edge of the edible portion close to the line of the saw, and as the finger is rapidly accelerated and lifted, it tends to slide or kick the cut end of the severed edible portion rapidly ahead and at the same time to lift it at the trailing edge. Thus the edible portion to be filleted is flipped over into the chute 63 on its back with its cut end foremost or down the chute. Meanwhile the severed head is discharged via the chute 61.

The edible portion is maintained upright as it passes down the chute by the guides 102. As it reaches the position shown in Fig. 17, it is kicked rapidly ahead into the filleting knives by the roller 121 (or by the fingers 128), its forward or leading end being held down by the arms 129. As the fish passes between the filleting knives, its back is momentarily supported between the shearing discs 114 while the knives 103 are progressively cutting off the fillets along the lines $d$ of Figs. 2 and 3. The shearing discs 114 thus cooperate with the knives 103 to assist in obtaining a clean shearing cut of the knives over the entire inner faces of the fillets and to insure a clean cut through the skin of the fish around the edge of the fillets as well as their complete severance from the middle section.

As the fillets are removed, one outside of each knife 103, they drop into the flaring end of the lower section 96 of the feed chute and are discharged through separate passages 134 formed by the ribs 135 (Fig. 11). Meanwhile the waste middle section is closely engaged between the parallel inner bevels 117 of the cutting knives. The frictional drag of these surfaces is exerted in a direction substantially parallel to the line of feed so that their tendency is to pull the fish by its middle section into and through the cutting and shearing zone. The waste middle section itself is pulled rapidly past the shearing discs by the knives and is ejected from the knives in the direction of the arrow 136 in Fig. 17, this action being enhanced by the fact that the spacing between the bevels is constantly increasing due to the angular relation of the knife axes as explained above.

Thus a machine embodying the invention produces fillets which are clean and free of bone and other undesirable parts. Due to the non-linear shape of the beheading cut, the maximum amount of edible meat is retained in the edible portion of the fish while at the same time the head, belly and needle bones around the belly cavity are practically completely removed. Any small parts of the belly cavity or of the needle bones which do remain in the edible portion are later eliminated with the waste middle section of the fish due to the spacing of the filleting cuts. At the same time the curvature and location of these cuts are such as to provide adequate spacing at the points where it is needed to eliminate undesirable waste parts, and to approach one another more closely at points appropriate for obtaining a maximum yield of fillets.

These results are secured in a machine which is fully automatic, requiring only the placing of the fish in the machine at the loading station and the collection of the cut fillets at the discharge points. These fillets are cut cleanly without tearing of the flesh and are completely severed from the waste middle section due to the coaction between the shearing discs and the cutting knives, the waste middle section being automatically ejected from the filleting means. The successive operations of beheading and filleting take place rapidly and the machine is capable of handling fish as rapidly as they can be fed to it by the operator.

While only one embodiment of the invention has been described and illustrated in the drawings, it will be understood by those skilled in the art that the invention is not limited to this embodiment and that various changes may be made in the form, details of construction and arrangement of the parts and equivalent mechanisms and devices substituted for those illustrated without departing from the spirit of the invention. Reference should therefore be had to the appended claims for a definition of the limits of the invention.

What is claimed is:

1. In apparatus of the class described, a cutter, means for advancing a fish to the cutter with the fish lying on one side and at an angle to its direction of movement, whereby said cutter cuts through the fish to separate the head and entrails from the edible flesh, and means for retarding the forward movement of one end of the fish relative to the forward movement of its other end while the cutter is cutting through the fish so that the line of cut in the fish is non-linear.

2. In apparatus of the class described, a cutter, means for advancing a fish to the cutter with the fish lying on one side and at an angle to its direction of movement, whereby said cutter cuts through the fish to separate the head and entrails from the edible flesh, and means for retarding the forward movement of one end of the fish relative to the forward movement of its other end while the cutter is cutting through the fish on the belly side of its backbone to make a non-linear cut conforming approximately to the shape of the rear edge of the belly cavity of the fish.

3. In apparatus of the class described, a cutter, means for advancing a fish to the cutter with the fish lying on one side and at an angle to its direction of movement, whereby said cutter cuts through the fish to separate the head and entrails from the edible flesh, and means for first retarding the forward movement of one end of the fish and then accelerating the forward movement of said one end relative to the forward movement of its other end while the cutter is cutting through the fish so that the line of cut in the fish is non-linear.

4. In apparatus of the class described, a cutter, means for advancing a fish to the cutter with the fish lying on one side and at an angle to its direction of movement, the back of the fish being toward the cutter and the nose of the fish ahead of its tail, whereby said cutter cuts through the fish to separate the head and entrails from the edible flesh, and means for retarding the forward movement of the tail end of the fish relative to the forward movement of its nose end substantially as the cutter reaches the backbone of the fish to change the direction of the line of cut in the fish.

5. In apparatus of the class described, a cutter, means for advancing a fish to the cutter with the fish lying on one side and at an angle to its direction of movement, the back of the fish being toward the cutter and the nose of the fish ahead of its tail, whereby said cutter cuts through the fish to separate the head and entrails from the edible flesh, and means for retarding the forward movement of the tail end of the fish relative to the forward movement of its nose end substantially as the cutter reaches the backbone of the fish, and then accelerating the forward movement of the tail end of the fish as the cutter completes its cut through the belly side of the fish.

6. In apparatus of the class described, a cutter for separating the head and entrails of a fish from its edible flesh, the fish lying on one side and at an angle to its direction of movement as it moves past the cutter, and means for moving the fish past the cutter comprising independently controllable elements engaging opposite ends of the fish and moving past the cutter on opposite sides thereof, the forward movement of one of said elements being retarded relative to the forward movement of the other element as the fish is being cut.

7. In apparatus of the class described, a cutter for separating the head and entrails of a fish from its edible flesh, the fish lying on one side and at an angle to its direction of movement as it moves past the cutter, and means for moving the fish past the cutter comprising independently controllable elements engaging opposite ends of the fish and moving past the cutter on opposite sides thereof, the forward movement of one of said elements being first retarded and then accelerated relative to the forward movement of the other element as the fish is being cut.

8. In apparatus of the class described, a cutter for separating the head and entrails of a fish from its edible flesh, the fish moving toward and past the cutter lying on one side back first and at an angle to its direction of movement with its nose ahead of its tail, means for moving the fish past the cutter comprising independently controllable elements respectively engaging the nose end and the tail end of the fish and movable past the cutter on opposite sides thereof, and means for advancing said elements at varying relative speeds to cause retardation of the tail end of the fish relative to its nose end substantially as the cutter reaches the backbone of the fish to change the direction of the line of cut in the fish.

9. In apparatus of the class described, a cutter for separating the head and entrails of a fish from its edible flesh, the fish moving past the cutter lying on one side back first and at an angle to its direction of movement with its nose ahead of its tail, means for moving the fish past the cutter comprising independently controllable elements respectively engaging the nose end and the tail end of the fish and movable past the cutter on opposite sides thereof, and means for advancing said elements at varying relative speeds to cause first retardation of the tail end of the fish relative to its nose end substantially as the cutter reaches the backbone of the fish and then acceleration of the tail end of the fish as the cutter completes its cut through the belly side of the fish.

10. In apparatus of the class described, a cutter for separating the head and entrails of a fish from its edible flesh, a feeding device movable toward and past the cutter on one side thereof, said device being disposed at an angle to its direction of movement and its inner end nearest the cutter being the trailing end, the fish lying on one side ahead of said device with its soft belly engaging said inner end and its edible portion projecting beyond said inner end and on the other side of the cutter, a second feeding device movable toward and past the cutter on said other side and engaging said edible portion, and means for retarding the forward movement of said second device relative to the forward movement of said first device substantially as said cutter reaches the backbone of the fish and then accelerating said second device relative to said first device as said cutter completes its cut through the fish.

11. In apparatus of the class described, a cutter for separating the head and entrails of a fish from its edible flesh, a feeding device movable toward and past the cutter on one side thereof, said device being disposed at an angle to its direction of movement and its inner end nearest the cutter being the trailing end, the fish lying on one side ahead of said device with its soft belly engaging said inner end and its edible portion projecting beyond said inner end and on the other side of the cutter, a longitudinal guide member adapted to engage the operculum of the fish as it moves toward said cutter, a second feeding device movable toward and past the cutter on said other side and engaging said edible portion, and means for retarding the forward movement of said second device relative to the forward movement of said first device substantially as said cutter reaches the backbone of the fish and then accelerating said second device relative to said first device as said cutter completes its cut through the fish.

12. In apparatus of the class described, a cutter for separating the head and entrails of a fish from its edible flesh, a feeding device movable toward and past the cutter on one side thereof, said device being disposed at an angle to its direction of movement and its inner end nearest the cutter being the trailing end, the fish lying on one side ahead of said device with its soft belly engaging said inner end and its edible portion projecting beyond said inner end and on the other side of the cutter, a vertically movable plate resting on the nose end of said fish as it travels toward said cutter, a second feeding device movable toward and past the cutter on said other side and engaging said edible portion, and means for retarding the forward movement of said second device relative to the forward movement of said first device substantially as said cutter reaches the backbone of the fish and then accelerating said second device relative to said first device as said cutter completes its cut through the fish.

13. Apparatus as defined in claim 12 comprising cooperating longitudinal guides one beneath the fish and one on said plate above the fish, each guide engaging the adjacent operculum of the fish.

14. In apparatus of the class described, a vertical cutter, a horizontal support, means for advancing a fish along said support to said cutter with the fish lying on one side and at an angle to its direction of movement, the back of the fish being toward the cutter and the nose of the fish ahead of its tail, whereby said cutter cuts through the fish to separate the head and entrails from the edible flesh, said support being cut away on the side of the cutter past which the edible portion of the fish moves, a downwardly inclined chute beneath the cut away part of the support to receive said edible portion, means for accelerating the forward movement of said edible portion and lifting its trailing edge as the cut is completed whereby said portion drops into the chute on its back cut end foremost, and filleting means at the lower end of said chute.

15. In apparatus of the class described, a vertical cutter for separating the head and entrails of a fish from its edible flesh, a horizontal support, a feeding device movable along said support toward and past the cutter on one side thereof, said device being disposed at an angle to its direction of movement and the fish lying on one side ahead of the device with its back toward the cutter and its nose ahead of its tail, said device engaging the nose end of the fish, and the edible portion projecting on the other side of the cutter, said support being cut away on said other side of the cutter, a downwardly inclined chute beneath the cut away part of the support, filleting means at the lower end of said chute, a second feeding device movable past said cutter on said other side thereof and adapted to engage the rear edge of said edible portion close to said cutter, and means for accelerating and lifting said second device as the cut is completed to overturn said edible portion into the chute on its back cut end foremost.

16. In apparatus of the class described, a vertical cutter for separating the head and entrails of a fish from its edible flesh, a horizontal support, a feeding device movable along said support toward and past the cutter on one side thereof, said device being disposed at an angle to its direction of movement and the fish lying on one side ahead of the device with its back toward the cutter and its nose ahead of its tail, said device engaging the nose end of the fish and the edible portion projecting on the other side of the cutter, said support being cut away on said other side of the cutter, a downwardly inclined chute beneath the cut away part of the support, filleting means at the lower end of said chute, a second feeding device movable past said cutter on said other side thereof and adapted to engage said edible portion, means for retarding the forward movement of said second device relative to the forward movement of said first device substantially as said cutter reaches the backbone of the fish and then accelerating said second device relative to said first device as said cutter completes its cut through the fish, said second device having a part engaging the rear edge of said edible portion close to said cutter, and means for lifting said part as the cut is completed to overturn said edible portion into the chute on its back, cut end foremost.

17. In a fish cutting machine the combination comprising a cutter, a table arranged to receive a fish lying on its side, mechanism for moving the fish along a defined path with relation to the cutter, means for guiding the fish during the course of its travel along the table to the cutter, a chute depending from the table with opening into the chute from the table alongside the cutter, a holder movable with the fish during the course of its travel to the cutter and during the cutting, said holder having a finger adaptable to be brought into engagement with the fish for turning the fish when the holder is lifted out of engagement therewith, mechanism for controlling the position of the holder including means for moving the holder into engagement with the fish preliminary to and during cutting and means for lifting the holder out of engagement with the fish after the completion of the cutting operation and during the continuance of its feed whereby the finger will turn the body of the fish to enter and pass down through the chute belly up and cut end foremost, and filleting knives associated with the chute and arranged to remove fillets from the fish body.

18. In apparatus of the class described, a downwardly inclined feed chute, a pair of rotatable disc knives adapted to receive and fillet the body of a fish passing down said chute, said knives being angularly related to produce an approximately wedge-shaped cut in the fish body, the line of feed as defined by the chute being approximately tangent to the lower peripheries of said knives, and rotating shear discs mounted below the line of feed with their peripheries cooperating with the peripheries of the knives to provide a pair of shearing elements on each side of the line of feed.

19. In apparatus of the class described, a downwardly inclined feed chute, a pair of rotatable disc knives, the line of feed as defined by the chute passing between the planes of the knives and approximately tangent to their lower peripheries, the axes of said knives being angularly related so that the point of closest approach of the peripheries of the knives is located slightly above the line of feed and up the chute with respect to a plane through the knife centers perpendicular to the line of feed, and rotating shear discs mounted below the line of feed and each having its periphery cooperating with the periphery of one of the knives to provide a pair of shearing elements.

20. In apparatus of the class described, a downwardly inclined feed chute, a pair of rotatable disc knives adapted to receive and fillet the body of a fish passing down said chute, said knives being angularly related to produce an approximately wedge-shaped cut in the fish body, the line of feed as defined by the chute being approximately tangent to the lower peripheries of said knives, and rotating shear discs mounted below the line of feed with their peripheries overlapping the peripheries of the knives to provide a pair of shearing elements one on each side of the line of feed, the inner margins of said knives being beveled at an angle such that the bevel surfaces are approximately vertical at the points where they overlap the peripheries of the shear discs.

21. In apparatus of the class described, a downwardly inclined feed chute, a pair of rotatable disc knives adapted to receive and fillet the body of a fish passing down said chute, said knives being angularly related to produce an approximately wedge-shaped cut in the fish body, the line of feed as defined by the chute being approximately tangent to the lower peripheries of the knives, rotating shear discs mounted below the line of feed with their peripheries cooperating with the peripheries of the knives to provide a pair of shearing elements on each side of the line of feed, and means at the lower end of the chute for engaging the body of the fish and feeding it ahead of said knives.

22. In apparatus of the class described, a downwardly inclined feed chute, a pair of rotatable disc knives adapted to receive and fillet the body of a fish passing down said chute, said knives being angularly related to produce an approximately wedge-shaped cut in the fish body, the line of feed as defined by the chute being approximately tangent to the lower peripheries of the knives, rotating shear discs mounted below the line of feed with their peripheries cooperating with the peripheries of the knives to provide a pair of shearing elements on each side of the line of feed, and means at the lower end of the chute for engaging the body of the fish and holding it down toward the bottom of the chute just before it reaches the cutting knives.

23. In apparatus of the class described, a downwardly inclined feed chute, a pair of rotatable disc knives adapted to receive and fillet the body of a fish passing down said chute, the line of feed as defined by the chute being approximately tangent to the lower peripheries of the knives, the axes of said knives being angularly related so that the point of closest approach of their peripheries is located slightly above the line of feed and up the chute with respect to a plane through the knife centers perpendicular to the line of feed, and rotating shear discs mounted below the line of feed with their peripheries overlapping the peripheries of the knives to provide a pair of shearing elements one on each side of the line of feed, the inner margins of said knives being beveled at an angle such that the bevel surfaces are approximately vertical at the points where they overlap the peripheries of the shear discs.

24. Apparatus as defined in claim 23, comprising means at the lower end of the chute for engaging the body of the fish and holding it down toward the bottom of the chute just before it reaches the cutting knives.

25. Apparatus as defined in claim 23, comprising means at the lower end of the chute for engaging the body of the fish and feeding it ahead to said knives.

26. In a fish cutting machine the combination comprising a cutter, a table arranged to receive a fish lying on its side with back facing the cutter, mechanism for moving the fish along the table onto the cutter including means for angularly positioning the fish on the table whereby the head and fore part of the belly of the fish will be severed from the remainder of the fish body by the cutter, means for guiding the fish during the course of its travel to the cutter including a member adapted and arranged to engage the operculum of the fish, a chute depending from the table with opening into the chute from off the table adjacent the cutter into which the body of the fish has entry to pass through the chute, and filleting knives associated with the chute and arranged to remove fillets from the fish body.

27. In a fish cutting machine the combination comprising a cutter, a table arranged to receive a fish lying on the side with back facing the cutter, mechanism for moving the fish along the table onto the cutter, said mechanism including means for angularly positioning the fish for receiving the cut and having a part engageable with a soft part in the belly of the fish, means for guiding the fish during the course of its travel to the cutter, a chute depending from the table with opening into the chute from off the table adjacent the cutter into which the body of the fish has entry to pass down the chute, and filleting knives associated with the chute and arranged to remove fillets from the fish body.

28. In a fish cutting machine the combination comprising a cutter, a table arranged to receive a fish lying on its side with back facing the cutter, mechanism for moving the fish along the table onto the cutter, said mechanism including means for angularly positioning the fish for receiving the cut and having a part engageable with a soft part in the belly of the fish, means for guiding the fish during the course of its travel to the cutter including a member extending in the direction of the line of travel and engageable with the operculum of the fish, a chute depending from the table with opening into the chute from off the table adjacent the cutter into which the body of the fish has entry to pass down the chute, and filleting knives associated with the chute and arranged to remove fillets from the fish body.

29. In a fish cutting machine the combination comprising a cutter, a table arranged to receive a fish lying on its side, a feeding device movable along a defined path with relation to the cutter, said feeding device having a fish engaging part disposed at an angle to said path so that said part will co-operate with the table in causing a fish on the table to swing to an angle to said path, and means for limiting sliding movement of the fish relatively to said fish engaging part, and for guiding the fish during the course of its travel to the cutter whereby it will occupy a defined position in relation to the cutter.

30. In a fish cutting machine the combination comprising a cutter, a table arranged to receive a fish lying on its side, a feeding device movable along a defined path with relation to the cutter, said feeding device having a fish engaging part disposed at an angle to said path so that said part will co-operate with the table in causing a fish on the table to swing at an angle to said path, a portion of said fish engaging part being engageable with a soft part in the belly of the fish, and means for limiting sliding movement of the fish relatively to said fish engaging part and co-operating with said portion to position and guide the fish during the course of its travel to the cutter whereby it will be made to occupy a defined position in relation to the cutter.

31. In a fish cutting machine the combination comprising a cutter, a table arranged to receive a fish lying on its side, a feeding device movable along a defined path with relation to the cutter, said feeding device having a fish engaging part disposed at an angle to said path so that said part will co-operate with the table in causing a fish on the table to swing to an angle to said path, a portion of said fish engaging part being engageable with a soft part in the belly of the fish, and means for limiting sliding movement of the fish relatively to said fish engaging part including means engageable with the operculum of the fish and cooperating with said portion to position and guide the fish during the course of its travel to the cutter whereby it will be made to occupy a defined position in relation to the cutter.

32. In a fish cutting machine the combination comprising a cutter, a table arranged to receive a fish lying on its side with back facing the cutter, mechanism for moving the fish along the table onto the cutter including means for angularly positioning the fish in relation to the line of feed, and means engageable with the operculum of the fish for limiting and defining the extent of transverse movement of the fish and for guiding the fish when positioned as aforesaid onto the cutter.

33. In a fish cutting machine the combination comprising a cutter, a table arranged to receive a fish lying on its side with back facing the cutter, mechanism for moving the fish along the table onto the cutter including means for angularly positioning the fish in relation to the line of feed, and means engageable with the operculum of the fish on the under side of its head for limiting and defining the extent of transverse movement of the fish and for assisting in guiding the fish when positioned as aforesaid onto the cutter, and other means engageable with the operculum of the fish on the top side of its head for assisting in maintaining the angularly turned position of the fish and guiding it onto the cutter.

34. In a fish cutting machine the combination comprising a cutter, a table arranged to receive a fish lying on its side with back facing the cutter, feed mechanism for moving the fish along the table onto the cutter including means for angularly positioning the fish in relation to the line of feed, guides, one on the table and the other supported above the table, both engaging the operculum of the fish, one on the under side of its head and the other on the upper side of its head, and means controlling the second one of said guides whereby it may be engaged by the operculum of the fish during the initial movement thereof imparted to the fish by the feed mechanism.

35. In a fish cutting machine the combination comprising a cutter, a table arranged to receive a fish lying on its side, a feed mechanism for moving the fish along a defined path with relation to the cutter, means for guiding the fish during the course of its travel along the table to the cutter, a holder for the body of the fish, means whereby the holder may be moved into and out of engagement with the body of the fish and have engagement therewith during the cutting, and means whereby the holder when in engagement with the body of the fish during the cutting will feed said body of the fish at a speed greater than that of said feed mechanism during the completion of the cut through the fish made by the cutter.

36. In a fish cutting machine the combination comprising a chute into which is received a fish body having a cut end, said body being disposed within the chute with back facing the bottom of the chute and cut end foremost, a filleting assembly associated with the chute and to which the fish body is fed, said fish cutting assembly including a shearing disk over which the fish body is fed in passing engagement and a set of filleting cutters with cutting edges in co-operative engagement with the shearing edges of the disk, means for rotating the cutters, and means providing a positive feed for the fish body to said cutting assembly and during the period of cutting.

37. In a fish cutting machine the combination comprising a chute into which is receive a fish body having a cut end, said body being disposed within the chute with back facing the bottom of the chute and cut end foremost, a filleting assembly associated with the chute and to which the fish body is fed, said assembly including a shearing disk over which the fish body is fed in passing engagement, a set of filleting cutters with cutting edges in co-operative engagement with the cutting edges of the disk, means for rotating the cutters, an endless feed incident to said chute bearing feed elements engageable with the fish body for feeding it along the chute to the cutting assembly, and means for centering the fish body within the chute and holding it in engagement with the feed elements.

38. In a fish cutting machine the combination comprising a chute into which is received a fish body having a cut end, said body being disposed within the chute with back facing the bottom of the chute and cut end foremost, a filleting assembly associated with the chute and to which the fish body is fed, said assembly including a shearing disk over which the fish body is fed in passing engagement, a set of filleting cutters with cutting edges in co-operative engagement with the cutting edges of the disk, means for rotating the cutters, an endless feed incident to said chute bearing feed elements engageable with the fish body for feeding it along the chute to the cutting assembly, means for centering the fish body within the chute and holding it in engagement with the feed elements, and a displaceable element having pressure contact with the cut end of the fish body preliminary to the cutting.

39. In a fish cutting machine the combination comprising a table for receiving a fish lying upon its side, a cutter to which the fish is advanced at an angle to its direction of movement, a main feed for moving the fish along the table in a defined path with relation to the cutter, means for guiding the fish during the course of its travel along the table to the cutter and which guides the fish during the period of its initial cutting by the cutter, a supplemental combination holding and feeding device engageable with the body of the fish and movable into and out of engagement therewith and having engagement therewith during the cutting, and means for operating said supplemental device whereby the body of the fish will be turned when held by said supplemental device during the cutting and the direction of the line of cut will be changed.

ROBERT F. JONES.

REFERENCES CITED

The following references are of record in the file of this patent:

UNITED STATES PATENTS

| Number | Name | Date |
| --- | --- | --- |
| 1,909,643 | Waugh | May 16, 1933 |